(12) United States Patent  
Panasik et al.

(10) Patent No.: US 7,207,248 B2  
(45) Date of Patent: Apr. 24, 2007

(54) THREADED SCREW FASTENER CHARACTERIZED BY HIGH PULL-OUT RESISTANCE, REDUCED INSTALLATION TORQUE, AND UNIQUE HEAD STRUCTURE AND DRIVE SOCKET IMPLEMENT OR TOOL THEREFOR

(75) Inventors: Cheryl L. Panasik, Elburn, IL (US); Yongping Gong, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 57 days.

(21) Appl. No.: 10/681,193

(22) Filed: Oct. 9, 2003

(65) Prior Publication Data

US 2005/0076751 A1    Apr. 14, 2005

(51) Int. Cl.  
*B25B 23/00* (2006.01)

(52) U.S. Cl. ............................. 81/451; 81/460; 81/461; 411/402; 411/411

(58) Field of Classification Search ................ 411/410, 411/411, 414, 416, 402; 81/460, 461, 451  
See application file for complete search history.

(56) References Cited

U.S. PATENT DOCUMENTS

| | | | |
|---|---|---|---|
| 1,435,134 A | | 11/1922 | Boley |
| 2,076,041 A | * | 4/1937 | Payne ......................... 411/410 |
| 2,248,695 A | * | 7/1941 | Bradshaw .................... 411/410 |
| 2,334,406 A | | 11/1943 | Gray |
| 2,353,531 A | * | 7/1944 | Whitney ...................... 411/410 |
| 3,283,638 A | * | 11/1966 | Ansingh ...................... 411/410 |
| 3,812,757 A | * | 5/1974 | Reiland .......................... 411/5 |
| 3,888,144 A | * | 6/1975 | Parsons ........................ 81/436 |
| 4,285,255 A | * | 8/1981 | Winfrey ....................... 81/451 |
| 4,361,997 A | | 12/1982 | DeCaro |
| 4,380,413 A | | 4/1983 | Dewey |
| 4,434,688 A | * | 3/1984 | Bowles ......................... 81/451 |
| 4,455,804 A | | 6/1984 | Francovitch |
| 4,630,984 A | | 12/1986 | Reinwall et al. |
| 4,641,472 A | | 2/1987 | Young et al. |

(Continued)

FOREIGN PATENT DOCUMENTS

DE    18 86 745 U    1/1964

(Continued)

*Primary Examiner*—Jacob K. Ackun, Jr.  
(74) *Attorney, Agent, or Firm*—Schwartz & Weinrieb

(57) ABSTRACT

A threaded screw fastener is provided with a head portion that has integrally incorporated therein dual drive structure whereby the single threaded screw fastener can be rotatably driven by alternative rotary drive socket implements or tools, such as, for example, hexagonally configured or Phillips head configured drive tools or implements, or a combination drive tool. A drive socket implement or tool also has integrally incorporated therein both hexagonally configured drive structure, Phillips head drive structure, and domed contour structure for not only structurally engaging both the hexagonally configured structure and the Phillips head structure integrally incorporated upon the head portion of the threaded screw fastener, but in addition, accommodates the low profile domed structure of the head portion of the threaded screw fastener. Lastly, the threaded screw fastener also comprises thread structure wherein each thread of the threaded screw fastener comprises rearward and forward flank surfaces which effectively serve to simultaneously enhance the pull-out resistance characteristics or properties of the threaded screw fastener while reducing the installation or insertion torque characteristics or properties of the threaded screw fastener.

17 Claims, 4 Drawing Sheets

U.S. PATENT DOCUMENTS

| | | | | |
|---|---|---|---|---|
| 4,726,164 | A | 2/1988 | Reinwall et al. | |
| 4,763,456 | A | 8/1988 | Giannuzzi | |
| 4,787,188 | A | 11/1988 | Murphy | |
| 4,803,823 | A | 2/1989 | Stenson | |
| 4,810,149 | A * | 3/1989 | Lee et al. | 411/411 |
| 4,900,208 | A | 2/1990 | Kaiser et al. | |
| 4,945,699 | A | 8/1990 | Murphy | |
| 4,987,714 | A | 1/1991 | Lemke | |
| 5,069,589 | A | 12/1991 | Lemke | |
| 5,102,275 | A | 4/1992 | Hulsey | |
| 5,217,339 | A | 6/1993 | O'Connor et al. | |
| 5,267,423 | A | 12/1993 | Giannuzzi | |
| 5,302,068 | A * | 4/1994 | Janusz et al. | 411/402 |
| 5,304,024 | A * | 4/1994 | Schuster | 411/418 |
| 5,378,102 | A | 1/1995 | Mossman | |
| 5,460,064 | A * | 10/1995 | Zayat, Jr. | 81/185 |
| 5,469,671 | A | 11/1995 | Rathgeber et al. | |
| 5,520,075 | A * | 5/1996 | Barmore | 81/437 |
| 5,697,746 | A * | 12/1997 | Brown et al. | 411/396 |
| 5,709,059 | A | 1/1998 | Murphy et al. | |
| 5,711,116 | A | 1/1998 | Hasan | |
| 5,913,650 | A * | 6/1999 | Daoud | 411/410 |
| 5,915,903 | A | 6/1999 | Osterle et al. | |
| 6,004,645 | A | 12/1999 | Hubbard | |
| 6,055,786 | A | 5/2000 | Hubbard et al. | |
| 6,158,939 | A * | 12/2000 | Grossberndt et al. | 411/411 |
| 6,250,034 | B1 | 6/2001 | Hulsey | |
| 2004/0037688 | A1 * | 2/2004 | Ansell | 414/729 |

FOREIGN PATENT DOCUMENTS

| | | |
|---|---|---|
| FR | 2 361 568 A | 3/1978 |
| GB | 2 092 253 A | 8/1982 |

* cited by examiner

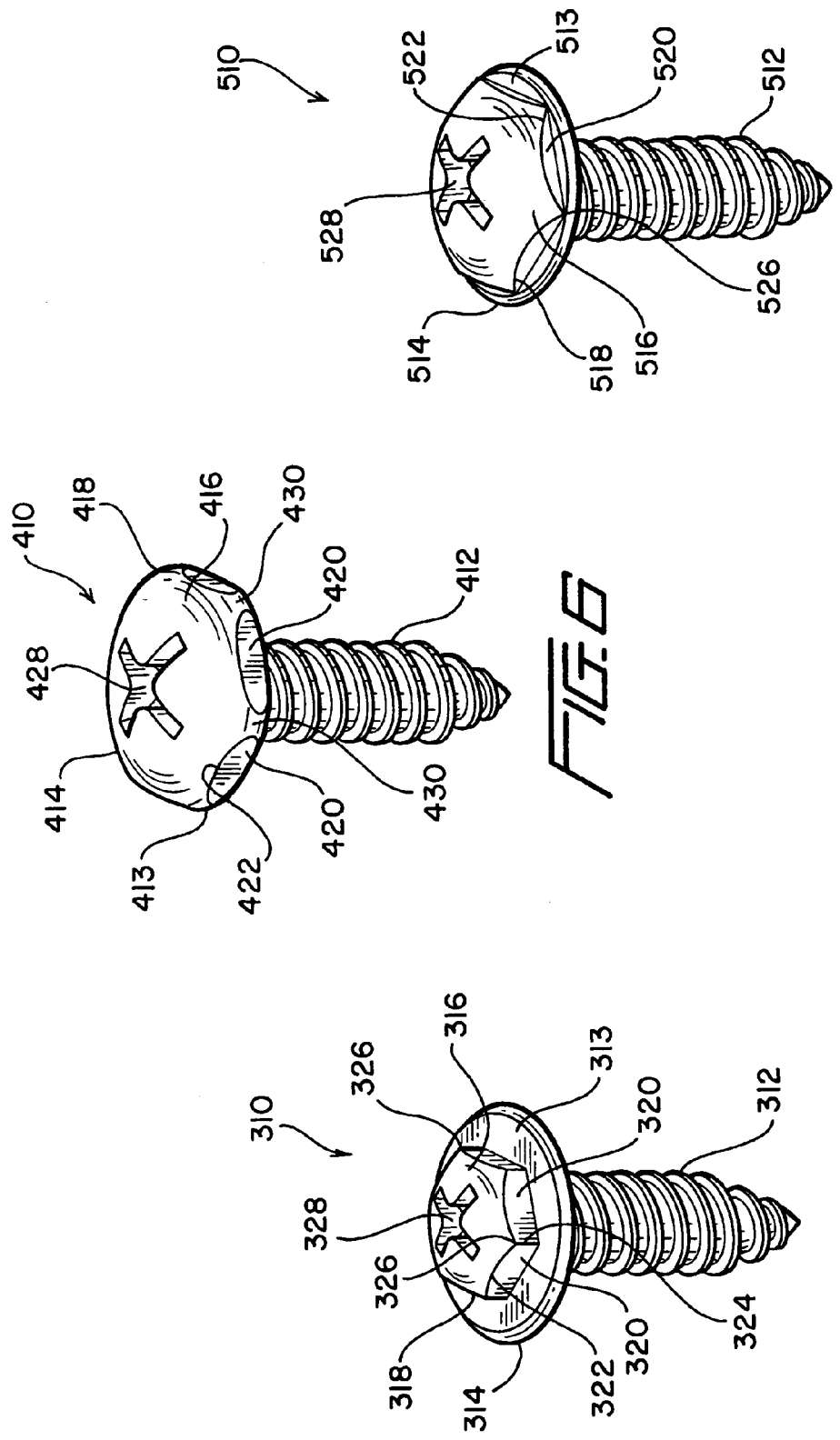

THREADED SCREW FASTENER CHARACTERIZED BY HIGH PULL-OUT RESISTANCE, REDUCED INSTALLATION TORQUE, AND UNIQUE HEAD STRUCTURE AND DRIVE SOCKET IMPLEMENT OR TOOL THEREFOR

FIELD OF THE INVENTION

The present invention relates generally to threaded screw fasteners, and more particularly to a new and improved threaded screw fastener which has unique and novel buttress thread structure which effectively provides the new and improved threaded screw fastener with reduced installation or insertion torque characteristics, and which also effectively provides the new and improved threaded screw fastener with enhanced pull-out resistance characteristics, whereby the new and improved threaded screw fastener can be easily and readily inserted or installed, and retained, within various different substrates, such as, for example, steel, concrete, aluminum, wood, and thermoplastic materials, and still further, the new and improved threaded screw fastener has unique and novel head structure which not only enables the new and improved threaded screw fastener to be inserted or installed within a substrate as a result of being capable of being alternatively utilized either with a Phillips head drive socket implement or tool, or with a hexagonal drive socket implement or tool, but in addition, the head structure comprises low-profile domed structure such that when the new and improved threaded screw fastener is utilized to secure waterproof or environmental membranes upon roof decking assemblies, the new and improved head structure will not present any raised edge or sharply pointed corner structure which would otherwise tend to cut or pierce the waterproof or environmental membranes whereby the structural integrity of the waterproof or environmental membranes would be adversely affected as a result of propagated tearing or shredding of the same, particularly under high-wind, uplifting force conditions.

BACKGROUND OF THE INVENTION

When a threaded screw fastener is to be inserted or installed within a particular substrate, the threaded screw fastener must obviously be rotated in order to enable the threaded screw fastener to threadedly engage the substrate material. Accordingly, a rotational drive force must be imparted to the threaded screw fastener. Conventionally, the two most common means for imparting rotational drive forces to threaded screw fasteners is either by means of a hexagonal drive socket implement or tool which is adapted to engage a corresponding hexagonally configured head portion of the fastener, or alternatively, by means of a Phillips head drive socket implement or tool which is adapted to engage a correspondingly configured Phillips head portion of the fastener. Typical threaded screw fasteners, respectively having such a hexagonally configured head portion, or a Phillips head portion, are disclosed within FIGS. 1 and 2. More particularly, a first conventional PRIOR ART threaded fastener is disclosed within FIG. 1 and is generally indicated by the reference character 10. The threaded fastener 10 is seen to comprise a threaded shank portion 12, and a head portion 14. The head portion 14 has a hexagonal cross-sectional configuration, and it is also seen that the hexagonally-configured head portion 14 has a constant depth dimension D, as defined between vertically spaced, horizontally disposed, upper and lower planar surfaces 16,18. As a result of such structure, the hexagonally-configured head portion 14 exhibits a relatively large profile. Alternatively, a second conventional PRIOR ART threaded fastener is disclosed within FIG. 2 and is generally indicated by the reference character 110. The threaded fastener 110 is seen to comprise a similarly threaded shank portion 112, and a head portion 114. The head portion 114 is provided with a substantially X-shaped slotted region 116 which is recessed within the head portion 114 so as to be capable of accommodating a Phillips head drive socket implement or tool, and it is additionally seen that the upper surface 118 of the head portion 114 has a substantially domed configuration which circumferentially slopes downwardly so as to terminate in a relatively thin-dimensioned peripheral surface 120.

While the conventional PRIOR ART threaded fasteners 10,110 normally exhibit satisfactory operational or performance characteristics, the conventional PRIOR ART threaded fasteners 10,110 do in fact exhibit some significant operational drawbacks. For example, different field personnel usually prefer to use a particular one of the two different types of conventional PRIOR ART threaded screw fasteners, and accordingly have suitable drive socket implements or tools for drivingly engaging the head portions of the particular threaded screw fasteners. The obvious problem with the existence or availability of the two different types of conventional PRIOR ART threaded screw fasteners resides in the manufacture and distribution of such threaded screw fasteners, that is, the threaded screw fastener manufacturers need to manufacture or fabricate the two different types of threaded screw fasteners, they need to stock the two different types of threaded screw fasteners in their available inventories, and they need to maintain proper and appropriate records in connection with the distribution of such different types of threaded screw fasteners to different distribution centers or end-use customers. Similar manufacturing, fabrication, inventory, distribution, and logistical problems correspondingly exist in connection with the availability of the suitable drive socket implements or tools for drivingly engaging the head portions of the different threaded screw fasteners. A need therefore exists in the art for a new and improved threaded screw fastener which is provided with a head portion that has integrally incorporated therein both hexagonal and Phillips head structure so as to be capable of being rotationally driven by means of a new and improved single drive socket implement or tool which likewise has integrally incorporated therein structure which is uniquely adapted to engage either one of the hexagonal and Phillips head structures integrally disposed upon the head portion of the threaded screw fastener.

In addition, it is seen that the vertically spaced, horizontally disposed, upper and lower planar surfaces 16,18, together with the six, vertically oriented side surfaces or facets 20 of the head portion 14, define a plurality of vertically spaced, upper and lower peripheral edge portions 22, wherein each one of the upper and lower peripheral edge portions 22 defines, includes, or comprises a 90° angle. It is also seen that adjacent pairs of the side surfaces or facets 20,20 define a plurality of vertically oriented edge regions or loci 24 therebetween, whereby the upper and lower termini of the vertically oriented edge regions or loci 24 define sharply pointed corner loci 26. Accordingly, when the threaded screw fasteners 10 are utilized, for example, in connection with the fastening or securing of waterproof or environmental membranes to underlying roof decking assemblies, the peripheral edge portions 22, defined between the vertically oriented side surfaces or facets 20 and the upper planar surface 16, as well as the upper corner loci 26 disposed within the plane of the upper planar surface 16, present sharply configured structures.

It has been found that such sharply configured structures can effectively cut or pierce the waterproof or environmental membranes when, for example, the waterproof or environmental membranes are forced into contact with the fastener head portions 14 as a result of, for example, workmen walking upon the upper surface portion of the roof decking assembly. Accordingly, once the waterproof or environmental membranes are cut or pierced, the waterproof or environmental membranes tend to undergo further structural deterioration, such as, for example, propagated shredding or tearing, particularly under high-wind lift force conditions, thereby effectively compromising the structural integrity of the waterproof or environmental membranes and of course the protective properties of the waterproof or environmental membranes with respect to the underlying roof decking and insulation substrates. This is obviously not a desirable situation from the viewpoint of installing a proper, environmentally protected roof decking system. A need therefore exists in the art for a new and improved threaded screw fastener which is provided with a head portion that not only has integrally incorporated therein both hexagonal and Phillips head structure so as to be capable of being rotationally driven by means of a single drive socket implement or tool which likewise has integrally incorporated therein structure which is uniquely adapted to engage either one of the hexagonal and Phillips head structures integrally disposed upon the head portion of the screw fastener, but in addition exhibits a relatively low profile.

Continuing further, and with reference now being made to FIGS. 3 and 4, an additional conventional PRIOR ART threaded screw fastener is partially disclosed and is generally indicated by the reference character 210. The threaded screw fastener 210 comprises a shank portion 212 upon which a plurality of buttress-type threads 214 are formed. As can best be seen or appreciated from FIG. 4, each one of the conventional buttress-type threads 214 is seen to comprise a slightly inclined rearward flank surface 216 and a significantly inclined forward flank surface 218, a predetermined thread pitch P, as measured between the same points of successive thread crest portions 220, and a predetermined spacing S as determined between the root region of the rearward flank surface 216 of a particular thread and the root region of the forward flank surface 218 of the next or successive thread. As is well-known in the art or industry, the rear flank surface 216, as well as the pitch P, play critical roles in, or effectively determine, the pull-out resistance characteristics or properties of the fastener 210, while the forward flank surface 218, and the spacing S, likewise play critical roles in, or effectively determine, the installation or insertion torque characteristics or properties of the fastener 210. As is further well-known in the art of industry, the ideal or perfectly designed fastener will exhibit relatively high pull-out resistance characteristics or properties, while concomitantly exhibiting relatively low installation or insertion torque characteristics or properties. Unfortunately, conventional or PRIOR ART fasteners, such as, for example, the fastener 210, as disclosed within FIGS. 3 and 4 and characterized by means of the conventional or PRIOR ART buttress thread structure, cannot effectively simultaneously achieve the aforenoted relatively high pull-out resistance characteristics or properties and the relatively low insertion or installation torque characteristics or properties.

More particularly, in order to effectively increase the pull-out resistance characteristics or properties of the threaded screw fastener 210, the diametrical extent of the threaded screw fastener 210 would have to be increased, that is, the external diametrical dimensions or extents of both the shank portion 212 and the threads 214 as determined by means of the crest portions 220 thereof. Increasing the diametrical dimension or extent of the threaded screw fastener 210, however, is not desirable or viable for several reasons. Firstly, for example, increasing the diametrical dimension or extent of the threaded screw fastener 210 obviously increases the amount of material that is required to be structurally incorporated within each fastener 210, and therefore the manufacturing or fabrication costs per fastener are correspondingly increased. In addition, or secondly, increasing the diametrical dimension or extent of the threaded screw fastener 210 also serves to increase the installation or insertion torque characteristics or properties of the fastener 210, which, of course, is precisely the opposite objective that is sought to be achieved in connection with the threaded screw fastener 210. Viewed from an opposite point of view, if, for example, the diametrical dimension or extent of the threaded screw fastener 210 was decreased so as to effectively reduce the torque installation or insertion characteristics or properties of the threaded screw fastener 210, then the pull-out resistance characteristics or properties of the threaded screw fastener 210 would be correspondingly reduced, which, again, is precisely the opposite objective that is sought to be achieved in connection with the threaded screw fastener 210. A need therefore exists in the art for a new and improved threaded screw fastener which can simultaneously achieve both enhanced pull-out resistance characteristics or properties, and reduced installation or insertion torque characteristics or properties, while also retaining manufacturing or fabrication costs at a viable or cost-effective level.

OBJECTS OF THE INVENTION

Accordingly, it is an object of the present invention to provide a new and improved threaded screw fastener and a drive socket implement or tool therefor.

Another object of the present invention is to provide a new and improved threaded screw fastener, and a drive socket implement or tool therefor, which effectively overcomes the various operational and manufacturing drawbacks and disadvantages characteristic of conventional PRIOR ART threaded screw fasteners and drive socket implements or tools.

An additional object of the present invention is to provide a new and improved threaded screw fastener which is provided with head structure that permits the threaded screw fastener to be rotatably driven by means of alternative drive socket implements or tools, such as, for example, hexagonally configured socket implements or tools, or Phillips head configured socket implements or tools, whereby only a single type of threaded screw fastener is needed at a field installation or job site in view of the fact that the single type of threaded screw fastener can be inserted or installed within a substrate regardless of the type of drive socket implement or tool that a particular workman may be using at the field installation or job site.

A further object of the present invention is to provide a new and improved threaded screw fastener which is provided with unique and novel thread structure which permits the threaded screw fastener to exhibit enhanced pull-out resistance characteristics or properties while simultaneously exhibiting reduced installation or insertion torque characteristics or properties.

A last object of the present invention is to provide a new and improved threaded screw fastener which is provided with unique and novel thread structure which permits the threaded screw fastener to exhibit enhanced pull-out resistance characteristics or properties while simultaneously exhibiting reduced installation or insertion torque characteristics or properties, and without necessarily increasing the diametrical extent of the threaded screw fastener wherein the threaded screw fastener can be economically manufactured or fabricated due to an effective conservation, preservation, or minimalization of the amount material required to manufacture or fabricate the threaded screw fastener.

SUMMARY OF THE INVENTION

The foregoing and other objectives are achieved in accordance with the teachings and principles of the present invention through the provision of a new and improved threaded screw fastener which comprises a head portion that has low profile domed structure integrally incorporated therein, and wherein further, the head portion also has unique and novel combination structure which permits the threaded screw fastener to be rotatably driven either by means of a rotary drive tool having, for example, hexagonally configured drive structure integrally incorporated therein, or alternatively by means of a rotary drive tool having, for example, Phillips head drive structure integrally incorporated therein. In this manner, the threaded screw fastener, having such combination head structure, can be drivingly inserted or installed within substrates regardless of the particular drive socket implement or tool being utilized by field installation or job site personnel. Furthermore, in accordance with additional teachings and principles of the present invention, there is provided a new and improved drive socket implement or tool which has integrally incorporated therein both hexagonally configured drive structure, Phillips head drive structure, and domed contour structure for not only structurally accommodating both the hexagonally configured structure and the Phillips head structure integrally incorporated upon the head portion of the threaded screw fastener, but in addition, for accommodating the low profile domed structure of the head portion of the threaded screw fastener. Lastly, the threaded screw fastener also comprises thread structure wherein each thread of the threaded screw fastener comprises unique and novel rearward and forward flank surfaces which effectively serve to simultaneously enhance the pull-out resistance characteristics or properties of the threaded screw fastener while reducing the installation or insertion torque characteristics or properties of the threaded screw fastener.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 5 is a perspective view, similar to those of FIGS. 1 and 2, showing, however, a first embodiment of a new and improved threaded screw fastener constructed in accordance with the principles and teachings of the present invention wherein the head portion of the threaded screw fastener is integrally provided with combination structure which will permit the threaded screw fastener to be rotatably driven either by means of, for example, a hexagonally configured drive socket implement or tool, or alternatively, by means of, for example, a Phillips head drive socket implement or tool;

FIG. 6 is a perspective view, similar to that of FIG. 5, showing, however, a second embodiment of a new and improved threaded screw fastener constructed in accordance with the principles and teachings of the present invention wherein the head portion of the threaded screw fastener is likewise integrally provided with combination structure which will permit the threaded screw fastener to be rotatably driven either by means of, for example, a hexagonally configured drive socket implement or tool, or alternatively, by means of, for example, a Phillips head drive socket implement or tool;

FIG. 7 is a perspective view, similar to those of FIGS. 5 and 6, showing, however, a third embodiment of a new and improved threaded screw fastener constructed in accordance with the principles and teachings of the present invention wherein the head portion of the threaded screw fastener is also integrally provided with combination structure which will permit the threaded screw fastener to be rotatably driven either by means of, for example, a hexagonally configured drive socket implement or tool, or alternatively, by means of, for example, a Phillips head drive socket implement or tool;

DETAILED DESCRIPTION OF THE PREFERRED EMBODIMENT

Figure 1:
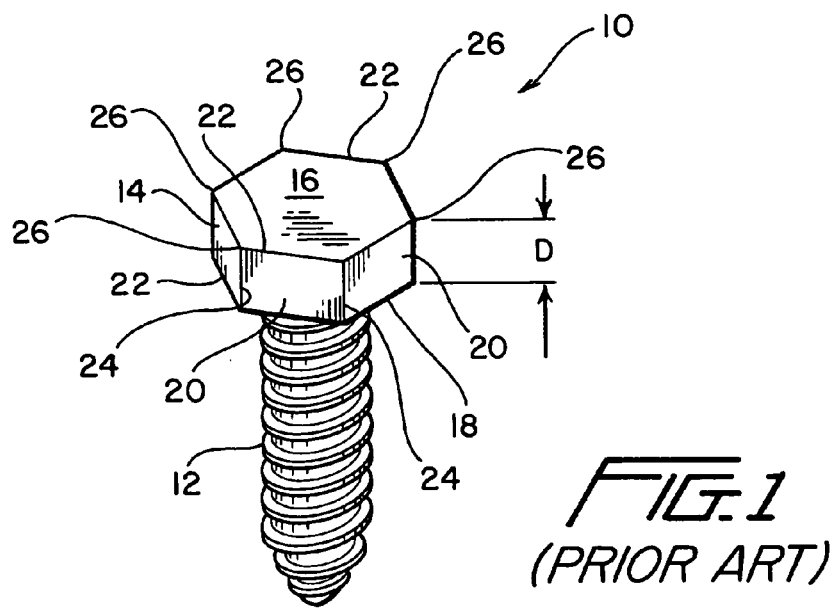
FIG. 1 is a perspective view of a conventional, PRIOR ART threaded screw fastener wherein the head portion integrally formed thereon has a hexagonal cross-sectional configuration.

Referring again to the drawings, and more particularly to FIG. 5 thereof, a first embodiment of a new and improved threaded screw fastener, constructed in accordance with the principles and teachings of the present invention, is disclosed and is generally indicated by the reference character 310. It is to be noted that, in view of the fact that the first embodiment of the new and improved threaded screw fastener 310 of the present invention has incorporated therein structural features which are somewhat similar to those structural features characteristic of the conventional PRIOR ART threaded screw fasteners 10,110 as respectively disclosed within FIGS. 1 and 2, such structural features of the first embodiment threaded screw fastener 310 will be designated by similar or corresponding reference characters except that they will be within the 300 series. Accordingly, the new and improved first embodiment threaded screw fastener 310 is seen to comprise a threaded shank portion 312, and a head portion 314, wherein the head portion 314 has integrally formed thereon a first embodiment of combination structure which permits the head portion 314 to be alternatively engaged either by means of a hexagonally configured drive socket implement or tool, or by means of a Phillips head drive socket implement or tool, whereby rotary drive can be imparted to the first embodiment threaded screw fastener 310 so as to drivingly install or insert the first embodiment threaded screw fastener 310 into a substrate. More particularly, it is seen that the head portion 314 of the first embodiment threaded screw fastener 310 comprises a circular washer member 313 integrally formed upon the upper end of the threaded shank portion 312, and upstanding, combination fastener drive structure is disposed atop the circular washer member 313 such that the circular washer member 313 effectively forms an annular flanged or shoulder portion surrounding the upstanding, combination fastener drive structure.

Figure 2:
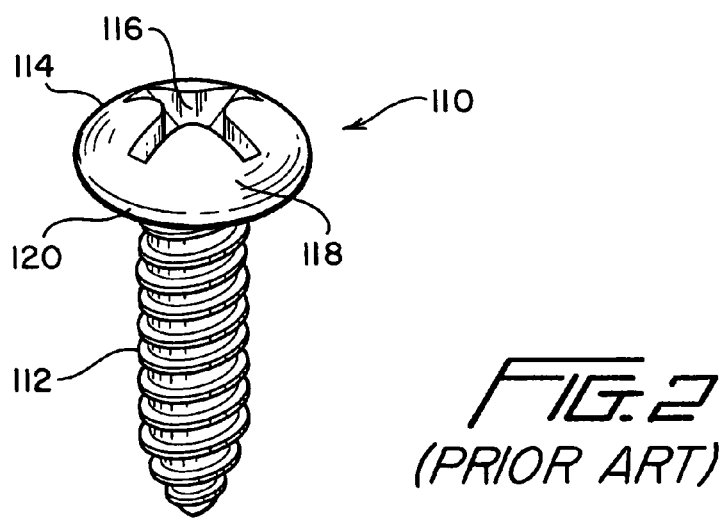
FIG. 2 is a perspective view of a conventional, PRIOR ART threaded screw fastener wherein the head portion integrally formed thereon has Phillips head drive structure formed therewithin.

The upstanding, combination fastener drive structure is seen to comprise a centrally located drive member 318 which comprises six vertically or axially oriented external sides or facets 320 such that the drive member 318 has a substantially hexagonal cross-sectional configuration, and a substantially X-shaped recessed section 328 is internally formed at an axially central location within the hexagonally configured drive member 318 so as to define a Phillips head drive member. It is further noted that the upper surface portion 316 of the centrally located hexagonally configured drive member 318, which is disposed substantially transversely or perpendicular to the longitudinal axis of the threaded screw fastener 310, actually has a domed configuration such that the upper surface portion 316 slopes downwardly in a circumferential manner from the axially located substantially X-shaped recessed section 328 toward the six vertically or axially oriented external sides or facets 320 which effectively form the outer periphery of the hexagonally configured drive member 318. In this manner, the vertical height dimension of the hexagonally configured drive member 318, as defined by means of the axial extent of the six vertically or axially oriented external sides or facets 320 of the hexagonally configured drive member 318, is relatively small. In addition, due to the circumferentially extending, downwardly sloped contour of the upper surface portion 316 of the hexagonally configured drive member 318, the upper edge portions 322 of the six vertically or axially oriented external sides or facets 320 of the hexagonally configured drive member 318, which substantially correspond to the upper edge portions 22 of the sides or facets 20 of the threaded screw fastener 10 as disclosed within FIG. 1, are not disposed at the uppermost elevational level of the threaded screw fastener 310. Furthermore, since the upper surface portion 316 of the hexagonally configured drive member 318 slopes downwardly in the aforenoted circumferential manner, the upper edge regions 322 of the hexagonally configured drive member 318, as defined at the junctions of the upper surface portion 316 and each one of the external sides or facets 320 of the hexagonally configured drive member 318, do not comprise 90° angles. Still further, and again due to the circumferentially extending, downwardly sloped contour of the upper surface portion 316 of the hexagonally configured drive member 318, the upper corner regions 326, as defined at the junctions of the vertically oriented edge regions or loci 324 and the upper edge regions 322 of the hexagonally configured drive member 318, are likewise disposed at an elevational level which is beneath the uppermost elevational level of the threaded screw fastener 310.

Accordingly, if portions of the waterproof or environmental membranes happen to be effectively forced into contact with the head portions 314 of the threaded screw fasteners 310 that secure the waterproof or environmental membranes to the underlying roof decking assembly, as a result of, for example, workmen personnel walking upon the upper surface portion of the roof decking assembly, then the waterproof or environmental membranes will be forced primarily into contact with and thereby encounter the circumferentially extending, downwardly sloped upper surface portions 316 of the threaded screw fasteners 310, and will not be primarily forced into contact with or encounter the upper edge portions 322 of the six vertically or axially oriented external sides or facets of the hexagonally configured drive member 318. Therefore, cutting, piercing, and ultimate shredding or tearing of the waterproof or environmental membranes is effectively prevented. Still further, it is also to be appreciated that by means of providing the first embodiment threaded screw fastener 310 with the combination fastener drive structure 318,328 that permits the first embodiment threaded screw fastener 310 to be rotatably driven by means of alternative drive socket implements or tools, such as, for example, hexagonally configured socket implements or tools, or by means of Phillips head configured socket implements or tools, only a single type of threaded screw fastener 310 is needed at field installation or job site locations in view of the fact that the single type of threaded screw fastener 310 can be inserted or installed within a substrate regardless of the type of drive socket implement or tool that a particular workman or field personnel may be using at the field installation or job site.

With reference now being made to FIG. 6, a second embodiment of a new and improved threaded screw fastener, constructed in accordance with the principles and teachings of the present invention so as to be functionally similar to the first embodiment of the new and improved threaded screw fastener 310 as disclosed within FIG. 5, is disclosed and is generally indicated by the reference character 410. It is to be noted that in view of the fact that the second embodiment threaded screw fastener 410 is structurally similar to the first embodiment threaded screw fastener 310, a detailed description of the same, except for those structural features unique to the second embodiment threaded screw fastener 410, will be omitted for brevity purposes. It is additionally noted that those structural features characteristic of the second embodiment threaded screw fastener 410, that correspond to similar structural features characteristic of the first embodiment threaded screw fastener 310, will be designated by similar or corresponding reference characters except that the reference characters will be within the 400 series. Accordingly, it is seen, for example, that the new and improved second embodiment threaded screw fastener 410 is seen to comprise a threaded shank portion 412, and a head portion 414, wherein the head portion 414 has integrally formed thereon a second embodiment of combination structure which permits the head portion 414 to be alternatively engaged either by means of a hexagonally configured drive socket implement or tool, or by means of a Phillips head drive socket implement or tool, whereby rotary drive can be imparted to the second embodiment threaded screw fastener 410 so as to drivingly install or insert the second embodiment threaded screw fastener 410 into a substrate.

More particularly, the head portion 414 of the second embodiment threaded screw fastener 410 comprises an upper surface portion 416 having a domed configuration which slopes downwardly in a circumferential manner from an axially central region of the head portion 414 toward the peripheral region of the head portion 414 as effectively defined by means of an underlying washer member 413. In addition, in a manner similar to that of the first embodiment threaded screw fastener 310, the combination fastener drive structure of the second embodiment threaded screw fastener 410 is seen to comprise substantially X-shaped recessed structure 428 which is defined within the axially central region of the head portion 414 so as to effectively define a Phillips head drive member, and six vertically or axially oriented external sides or facets 420 which are formed upon the external periphery of the washer member 413 whereby the external periphery of the head portion 414 effectively defines a drive member 418 which has a substantially hexagonal cross-sectional configuration. As a result of the aforenoted structure, as facilitated by means of the domed upper surface portion 416, the vertical height dimension of the hexagonally configured drive member 418, as defined by means of the axial extent of the six vertically or axially oriented external sides or facets 420 of the hexagonally configured drive member 418, is relatively small.

Still further, due to the circumferentially extending, downwardly sloped contour of the upper surface portion 416 of the hexagonally configured drive member 418, the upper edge portions 422 of the six vertically or axially oriented external sides or facets 420 of the hexagonally configured drive member 418, which substantially correspond to the upper edge portions 322 of the sides or facets 320 of the threaded screw fastener 310 as disclosed within FIG. 5, are not disposed at the uppermost elevational level of the threaded screw fastener 410. Furthermore, since the upper surface portion 416 of the hexagonally configured drive member 418 slopes downwardly in the aforenoted circumferential manner, the upper edge regions 422 of the hexagonally configured drive member 418, as defined at the junctions of the upper surface portion 416 and each one of the external sides or facets 420 of the hexagonally con-figured drive member 418, do not comprise 90° angles. Lastly, it is also seen that the individual vertically or axially oriented external sides or facets 420 of the hexagonally configured drive member 418 do not abut each other in a circumferential manner but, to the contrary, are effectively separated from each other by means of arcuate portions 430 of the washer member 413. Accordingly, such structure, in combination with the circumferentially extending, downwardly sloped contour of the upper surface portion 416 of the hexagonally configured drive member 418, effectively eliminates any sharply cornered or sharply edged regions upon the head portion 414 of the threaded screw fastener 410.

In light of the foregoing, it can be readily appreciated that if portions of the waterproof or environmental membranes happen to be effectively forced into contact with the head portions 414 of the threaded screw fasteners 410 that secure the waterproof or environmental membranes to the underlying roof decking assembly, as a result of, for example, workmen personnel walking upon the upper surface portion of the roof decking assembly, then the waterproof or environmental membranes will be forced into contact with and thereby encounter the circumferentially extending, downwardly sloped upper surface portions 416 of the threaded screw fasteners 410. In addition, since the sharp 90° edge portions, as defined between the upper edge portions 422 of the six vertically or axially oriented external sides or facets 420 of the hexagonally configured drive member 418 and the upper surface portion 416 of the head portion 414, have effectively been eliminated, as have the upper sharply pointed corner regions as defined between adjacent ones of the six vertically or axially oriented external sides or facets 420 of the hexagonally configured drive member 418 and the upper surface portion 416 of the head portion 414, then it follows that cutting, piercing, and ultimate shredding or tearing of the waterproof or environmental membranes is also effectively prevented. Still further, it is also to be appreciated, as was the case with the first embodiment threaded screw fastener 310, that by providing the second embodiment threaded screw fastener 410 with the combination fastener drive structure 418,428 that permits the second embodiment threaded screw fastener 410 to be rotatably driven by means of alternative drive socket implements or tools, such as, for example, hexagonally configured socket implements or tools, or by means of Phillips head configured socket implements or tools, only a single type of threaded screw fastener 410 is needed at field installation or job site locations in view of the fact that the single type of threaded screw fastener 410 can be inserted or installed within a substrate regardless of the type of drive socket implement or tool that a particular workman or field personnel may be using at the field installation or job site.

With reference now being made to FIG. 7, a third embodiment of a new and improved threaded screw fastener, also constructed in accordance with the principles and teachings of the present invention so as to be functionally similar to the first and second embodiments of the new and improved threaded screw fasteners 310,410 as disclosed within FIGS. 5 and 6, is disclosed and is generally indicated by the reference character 510. It is to be noted that in view of the fact that the third embodiment threaded screw fastener 510 is structurally similar to the first and second embodiment threaded screw fasteners 310,410, a detailed description of the same, except for those structural features unique to the second embodiment threaded screw fastener 510, will be omitted for brevity purposes. It is additionally noted that those structural features characteristic of the third embodiment threaded screw fastener 510, that correspond to similar structural features characteristic of the first and second embodiment threaded screw fasteners 310,410, will be designated by similar or corresponding reference characters except that the reference characters will be within the 500 series. Accordingly, it is seen, for example, that the new and improved third embodiment threaded screw fastener 510 is seen to comprise a threaded shank portion 512, and a head portion 514, wherein the head portion 514 has integrally formed thereon a third embodiment of combination structure which permits the head portion 514 to be alternatively engaged either by means of a hexagonally configured drive socket implement or tool, or by means of a Phillips head drive socket implement or tool, whereby rotary drive can be imparted to the third embodiment threaded screw fastener 510 so as to drivingly install or insert the third embodiment threaded screw fastener 510 into a substrate.

More particularly, it is seen that the head portion 514 of the third embodiment threaded screw fastener 510 effectively comprises hybrid structure with respect to the structure comprising the head portions 314,414 of the first and second embodiment threaded screw fasteners 310,410. For example, it is seen that the head portion 514 of the third embodiment threaded screw fastener 510 comprises a circular washer member 513 which is integrally formed upon the upper end of the threaded shank portion 512, and upstanding, combination fastener drive structure is disposed atop the circular washer member 513 such that the circular washer member 513 effectively forms an annular flanged portion which surrounds the upstanding, combination fastener drive structure. The upstanding, combination fastener drive structure is seen to comprise a first drive member 518 which comprises six vertically or axially oriented external sides or facets 520 such that the first drive member 518 has a substantially hexagonal cross-sectional configuration, and a second substantially X-shaped recessed section 528 is internally formed at an axially central location within the hexagonally configured drive member 518 so as to define a Phillips head drive member.

It is further noted that the upper surface portion 516 of the centrally located hexagonally configured drive member 518, which is disposed substantially transversely or perpendicular to the longitudinal axis of the threaded screw fastener 510, has a domed configuration, similar to the upper surface portions 316,416 of the threaded screw fasteners 310, 410, such that the upper surface portion 516 slopes downwardly in a circumferential manner from the axially located substantially X-shaped recessed section 528 toward the six vertically or axially oriented external sides or facets 520 which effectively form the outer periphery of the hexagonally configured drive member 518. However, as can be readily appreciated from FIG. 7 in connection with the disclosure of the third embodiment threaded screw fastener 510, particularly when compared to FIGS. 5 and 6 and their respective disclosures of the first and second embodiment threaded screw fasteners 310,410, it is noted that in lieu of the domed upper surface portion 516 effectively having a limited radial or diametrical extent which is somewhat less than that of the circular washer member 513, as was the case of the domed upper surface portion 316 of the first embodiment threaded screw fastener 310 as compared to the radial or diametrical extent of the circular washer member 313, the domed upper surface portion 516 of the third embodiment threaded screw fastener 510 has a radial or diametrical extent which is substantially the same as that of the circular washer member 513.

In connection with such structure, it is therefore additionally appreciated that in lieu of the vertically or axially oriented external sides or facets 520 of the drive member 518 being defined within the peripheral surface of the circular washer member 513, as was the case with the vertically or axially oriented external sides or facets 420 with respect to the outer peripheral surface of the circular washer member 413, the vertically or axially oriented external sides or facets 520 of the drive member 518 are disposed atop the circular washer member 513 and are disposed slightly radially inwardly offset from the outer peripheral edge portion of the circular washer member 513. Still further, it is also noted that the corner regions 526, defined between adjacent ones of the vertically or axially oriented external facets or sides 520 of the drive member 518 are effectively disposed at the peripheral edge of and within the plane of the circular washer member 513. Accordingly, the vertical height dimension of the hexagonally configured drive member 518, as defined by means of the axial extent of the six vertically or axially oriented external facets or sides 520 of the hexagonally configured drive member 518, is relatively small. In addition, as was characteristic of the head portions 314,414 of the first and second embodiment threaded screw fasteners 310,410, due to the circumferentially extending, downwardly sloped contour of the upper surface portion 516 of the hexagonally configured drive member 518, the upper edge portions 522 of the six vertically or axially oriented external sides or facets 520 of the hexagonally configured drive member 518 are not disposed at the uppermost elevational level of the threaded screw fastener 510.

Furthermore, since the upper surface portion 516 of the hexagonally configured drive member 518 slopes downwardly in the aforenoted circumferential manner, the upper edge regions 522 of the hexagonally configured drive member 518, as defined at the junctions of the upper surface portion 516 and each one of the external sides or facets 520 of the hexagonally configured drive member 518, do not comprise 90° angles. Still further, and again due to the circumferentially extending, downwardly sloped contour of the upper surface portion 516 of the hexagonally configured drive member 518, and in particular, due to the disposition of the corner regions 526, as defined between adjacent ones of the vertically or axially oriented external facets or sides 520 of the drive member 518, within the plane of the circular washer member 513, the presence of such sharply cornered regions, at a relatively high elevational level upon the head portion 514 of the threaded screw fastener 510, has effectively been eliminated. Accordingly, if portions of the waterproof or environmental membranes happen to be effectively forced into con-tact with the head portions 514 of the threaded screw fasteners 510 that secure the waterproof or environmental membranes to the underlying roof decking assembly, as a result of, for example, workmen personnel walking upon the upper surface portion of the roof decking assembly, then the waterproof or environmental membranes will be forced into contact with and thereby encounter the circumferentially extending, downwardly sloped upper surface portions 516 of the threaded screw fasteners 510, and will not be forced into contact with or encounter any sharply pointed edge or corner regions of the six vertically or axially oriented external sides or facets of the hexagonally configured drive member 518. Therefore, cutting, piercing, and ultimate shredding or tearing of the waterproof or environmental membranes is effectively prevented.

Still further, it is also to be appreciated that by means of providing the third embodiment threaded screw fastener 510 with the combination fastener drive structure 518, 528 that permits the third embodiment threaded screw fastener 510 to be rotatably driven by means of alternative drive socket implements or tools, such as, for example, hexagonally configured socket implements or tools, or by means of Phillips head configured socket implements or tools, only a single type of threaded screw fastener 510 is needed at field installation or job site locations. This mode of operation is of course facilitated or enabled in view of the fact that the single type of threaded screw fastener 510 can be inserted or installed within a substrate regardless of the type of drive socket implement or tool that a particular workman or field personnel may be using at the field installation or job site.

Figure 8:
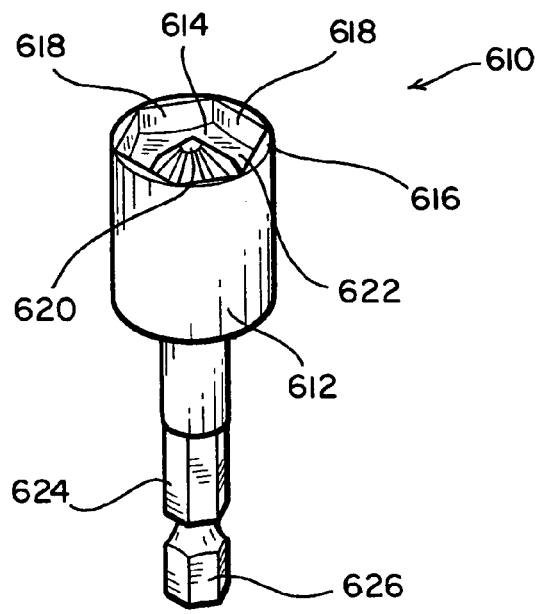
FIG. 8 is a perspective view of a new and improved drive socket implement or tool which has been constructed in accordance with the principles and teachings of the present invention and which has combination drive structure integrally incorporated therein which comprises hexagonally configured drive structure and Phillips head drive structure, as well as contoured mating surface structure, for accommodating and drivingly interfacing with, for example, the head portion of the first embodiment threaded screw fastener as disclosed within FIG. 5.
Figure 9:
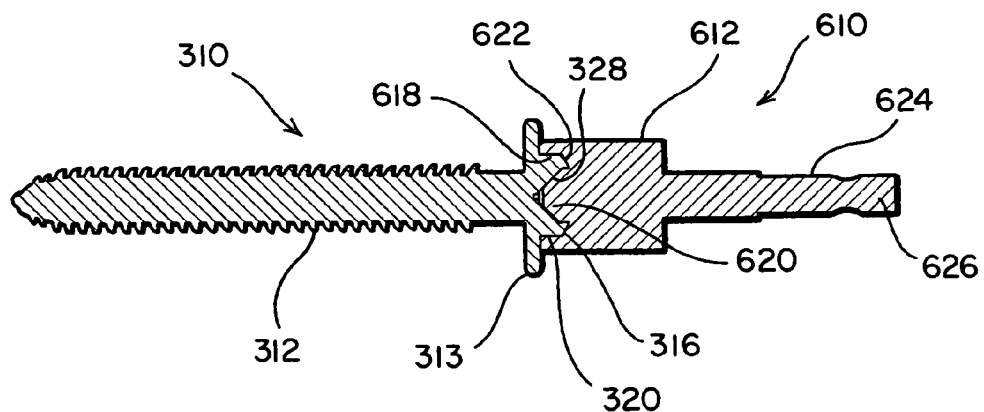
FIG. 9 is a cross-sectional view of the new and improved drive socket implement or tool, as disclosed within FIG. 8, and as operationally mated or engaged with the head portion of, for example, the first embodiment threaded screw fastener as disclosed within FIG. 5 so as to define therewith a drive socket implement or tool-fastener assembly.

With reference now being made to FIGS. 8 and 9, a new and improved drive socket implement or tool, for operatively engaging the head portion of any one of the threaded screw fasteners 310,410,510, as disclosed within FIGS. 5–7, so as to impart a rotatable drive force thereto, is disclosed and is generally indicated by the reference character 610. As can be readily appreciated, the new and improved drive socket implement or tool 610 is seen to comprise a cylindrical housing 612 which is open at the front end thereof so as to define a socket member 614 therewithin for accommodating and operatively mating with at least some of the drive structure defined upon the head portion of any one of the aforenoted threaded screw fasteners 310,410,510. It is to be noted that while, for example, the new and improved drive socket implement or tool 610 is disclosed as being operatively engaged with the head portion 314 of the threaded screw fastener 310, the new and improved drive socket implement or tool 610 can be structurally configured so as to appropriately operatively engage the head portions 414,514 of the threaded screw fasteners 410,510. More particularly, it is seen that the socket member 614 of the new and improved drive socket implement or tool 610 is provided with an annular or peripheral front face 616 which is disposed within a plane that is substantially perpendicular to the longitudinal axis of the socket implement or tool 610. Six inner peripheral wall members 618 of the socket member 614 are disposed within the immediate vicinity of the front face 616 of the socket implement or tool 610 so as to extend axially rearwardly from the front face 616 of the socket implement or tool 610, and in addition, the six inner peripheral wall members 618 are disposed within a circumferential array so as to effectively circumscribe a region within the socket member 614 which has a substantially hexagonal configuration. In this manner, when the new and improved socket implement or tool 610 is operatively engaged with the head portion 314 of the threaded screw fastener 310, the sides or facets 320 of the hexagonally configured drive member 318 can be drivingly engaged by means of the hexagonally arranged wall members 618 of the socket member 614. At the same time, it can likewise be appreciated that the front face 616 of the socket member 614 is properly seated upon the upper surface portion of the circular washer member 313, as can best be appreciated from FIG. 9, whereby the longitudinal axes of the socket implement or tool 610 and the threaded screw fastener 310 are coaxially aligned with respect to each other.

Continuing still further, it is appreciated that the socket member 614 is also provided with an axially located, forwardly extending, substantially X-shaped conical projection 620 which effectively defines a Phillips head screwdriver element which is adapted to operatively engage the X-shaped Phillips head recessed portion 328 defined within the head portion 314 of the threaded screw fastener 310 when, for example, the socket implement or tool 610 is operatively engaged with the head portion 314 of the threaded screw fastener 310 as disclosed within FIG. 9. Accordingly, the Phillips head screwdriver element 620 can be operatively used to engage the X-shaped Phillips head recessed portion 328 defined within the head portion 314 of the threaded screw fastener 310 in conjunction with the operative or driving engagement of the sides or facets 320 of the hexagonally configured drive member 318 of the head portion 314 of the threaded screw fastener 310 by means of the hexagonally arranged wall members 618 of the socket member 614. Lastly, in connection with the internal structure comprising the socket member 614, it is also seen that the socket member 614 comprises a concavely contoured mating surface 622 which is adapted to house or accommodate, for example, the domed upper surface portion 316 of the head portion 314 of the threaded screw fastener 310.

It is to be noted that while the socket member 614 may be provided with both the hexagonal drive means comprising the plurality of side wall members 618, as well as the Phillips head screwdriver element 620, in conjunction with the contoured mating surface 622, so as to properly drivingly engage the head portion 314 of the threaded screw fastener 310, only a single one of the drive means 618,620 truly needs to be provided in view of the fact that the threaded screw fastener 310 is provided with the dual drivable means 320, 328. On the other hand, it is further noted that just as the dual drivable means 320,328 as provided upon the threaded screw fastener 310, permits the same to be drivingly used and engaged by means of any drive socket implement or tool, the provision of the dual driving means 618,620, upon the socket implement or tool 610, permits it to drivingly engage any particular threaded screw fastener. It is lastly noted that in order to provide the socket implement or tool 610 with rotary drive motion to be appropriate or accordingly transmitted to the threaded screw fastener 310, it is seen that the housing 612 is mounted upon the forward end of a shaft member 624, and that the rear end of the shaft member 624 is provided with a stem portion 626 for insertion within, for example, a suitable collet member, not shown, of a rotary drive tool, also not shown.

Figure 10:
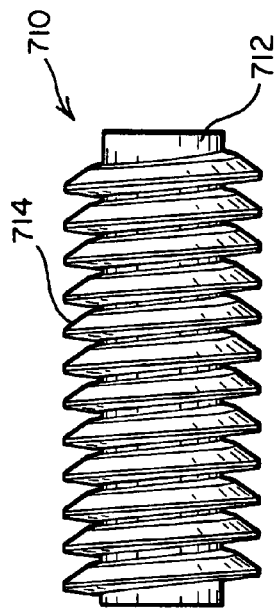
FIG. 10 is a partial side elevational view, similar to that of FIG. 3, showing, however, a threaded screw fastener wherein the thread portion thereof has been constructed in accordance with the principles and teachings of the present invention in order to simultaneously achieve high pull-out resistance characteristics or properties, and low installation or insertion torque characteristics or properties.
Figure 3:
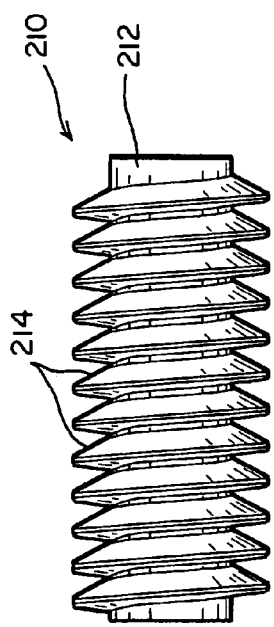
FIG. 3 is a partial side elevational view of a conventional, PRIOR ART threaded screw fastener which is provided with standard buttress threads.
Figure 11:
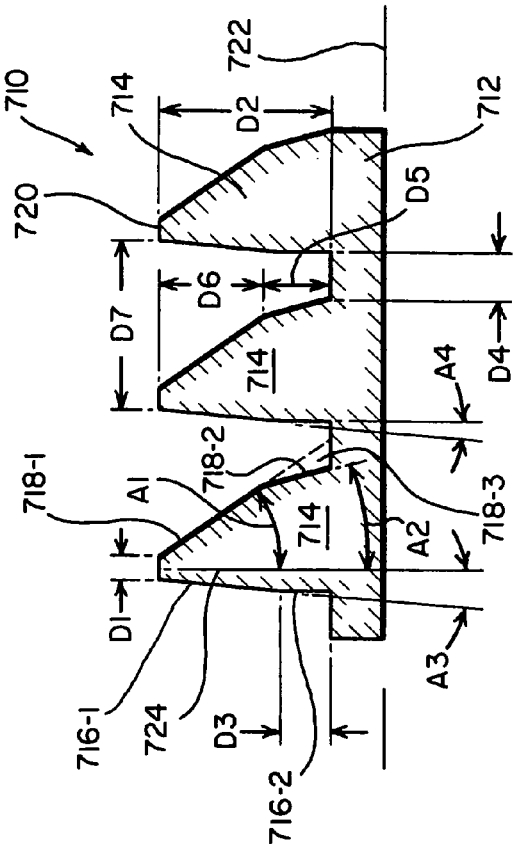
FIG. 11 is an enlarged partial cross-sectional view, similar to that of FIG. 4, showing, however, the detailed structure of several of the individual threads of the threaded screw fastener as disclosed within FIG. 10, particularly the rearward and forward flank surfaces thereof, the thread pitch, and the axial spacing defined between the root portion of the rearward flank surface of a particular thread and the roof portion of the forward flank surface of the next successive thread.

With reference lastly being made to FIGS. 10 and 11, a fourth embodiment of a new and improved threaded screw fastener constructed in accordance with the principles and teachings of the present invention is disclosed and is generally indicated by the reference character 710. As disclosed within FIGS. 10 and 11, the new and improved threaded screw fastener 710 comprises a shank portion 712 and a buttress thread portion 714, however, if the new and improved threaded screw fastener 710, as disclosed within FIGS. 10 and 11, is compared to the conventional PRIOR ART threaded screw fastener 210 as disclosed within FIGS. 3 and 4, it will be readily apparent that the structure of the individual threads 714 of the threaded screw fastener 710, as constructed in accordance with the principles and teachings of the present invention, is quite different from the structure of the individual threads 214 of the conventional PRIOR ART threaded screw fastener 210. More particularly, it is seen that in lieu of the conventional, PRIOR ART threaded screw fastener 210, wherein the individual threads 214 comprise, in effect, a slightly inclined rearward planar flank surface 216, and a significantly inclined forward planar flank surface 218, the individual threads 714 of the threaded screw fastener 710 of the present invention comprise at least one, and preferably two, substantially perpendicular rearward planar flank surfaces 716-1,716-2, and dual, inclined forward planar flank surfaces 718-1,718-2.

It is to be noted that, in connection with the structural design of the screw threads upon threaded screw fasteners, and as is well-known in the art or industry, as has been discussed hereinbefore, the rearward flank surface structure of each individual thread, as well as the pitch defined between each pair of adjacent threads, play critical roles in, or effectively determine, the pull-out resistance characteristics or properties of the threaded screw fastener, while the forward flank surface structure of each individual thread, as well as the spacing defined between the root portion of the rearward flank surface of a particular thread and the root portion of the forward flank surface of an adjacent thread, likewise play critical roles in, or effectively determine, the installation or insertion torque characteristics or properties of the threaded screw fastener. In particular, for example, as the perpendicularity of the rearward flank surface of each individual thread with respect to the longitudinal axis of the threaded screw fastener is increased, then the pull-out resistance characteristics or properties of the threaded screw fastener are likewise or accordingly increased, whereas as the inclination of the forward flank surface of each individual thread with respect to the radius of the threaded screw fastener is decreased, then the insertion or installation torque characteristics or properties are accordingly or likewise decreased. In conjunction with the particularly fabricated structure of the rearward and forward flank surfaces of the individual threads, it is also noted that the aforenoted pitch and spacing dimensions will be accordingly varied in order to likewise affect the pull-out resistance and installation or insertion torque characteristics or properties of the threaded screw fastener.

With reference therefore being made more specifically to FIG. 11, the longitudinal axis of the threaded screw fastener 710 is disclosed at 722, while a radius of the threaded screw fastener 710 is disclosed at 724. Accordingly, it can be appreciated that the angular extent or inclination of the radially outer forward flank surface 718-1 with respect to the radius 724 is designated by means of the angle A1, while the angular extent or inclination of the radially inner forward flank surface 718-2 with respect to the radius 724 is designated by means of the angle A2. In a similar manner, the angular extent or inclination of the radially outer rearward flank surface 716-1 with respect to the radius 724 is designated by means of the angle A3, while the angular extent or inclination of the radially inner rearward flank surface 716-2 with respect to the radially outer rearward flank surface 716-1 is designated by means of the angle A4. Still further, the axial extent or length of the crest portion 720 of each thread 714 is denoted by means of the linear dimension D1, while the radial extent or width of each thread 714 is denoted by means of the linear dimension D2, the radial extent or width of the radially inner rearward flank surface 716-2 of each thread 714 is denoted by means of the linear dimension D3, and the axial extent or distance defined between the root portion of the rearward flank surface of a particular thread 714 and the root portion of the forward flank surface of an adjacent thread 714 is denoted by means of the linear space dimension D4. In a similar manner, the radial extent or width of the radially inner forward flank surface 718-2 of each thread 714 is denoted by means of the linear dimension D5, the radial extent or width of the radially outer forward flank surface 718-1 of each thread 714 is denoted by means of the linear dimension D6, and the axial extent or distance defined between each pair of adjacent threads 714,714 is denoted by means of the linear pitch dimension D7.

Figure 4:
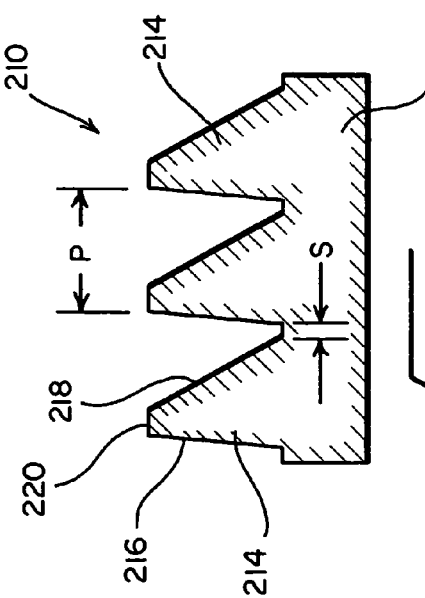
FIG. 4 is an enlarged partial cross-sectional view of the conventional, PRIOR ART threaded screw fastener, as disclosed within FIG. 3, showing the detailed structure of several of the individual threads of the threaded screw fastener, particularly the rearward and forward flank surfaces thereof.

Continuing further with reference being made to FIG. 11, and in accordance with the unique and novel teachings and principles of the present invention, due to the provision of, for example, the radially inner forward flank surface 718-2, wherein the same is disposed at the angular inclination A2, which is relatively steeper than the angular inclination A1 at which the radially outer forward flank surface 718-1 is disposed with respect to the radius 724, that is, the radially inner forward flank surface 718-2 is disposed so as to be more perpendicular with respect to the longitudinal axis 722 of the threaded screw fastener 710 than is the radially outer forward flank surface 718-1, then it can be appreciated that a portion of the forward flank surface, as denoted in phantom lines at 718-3, has in effect been removed when compared, for example, to the forward flank surface 218 of the standard buttress thread 210 as disclosed within FIG. 4. Accordingly, since less material is effectively present upon each composite forward flank surface 718-1,718-2 of each thread 714, less material is effectively present in order to operatively engage the material comprising the substrate into which the threaded screw fastener 710 is being inserted. In this manner, the provision of the particularly structured radially inner forward flank surface 718-2 upon each thread 714 effectively reduces the installation or insertion torque characteristics or properties of the threaded screw fastener 710.

In a corresponding manner, the provision of the particularly structured radially inner forward flank surface 718-2 upon each thread 714, and the particular angular inclinations A1,A2 of the radially outer forward flank surface 718-1 and the radially inner forward flank surface 718-2 upon each thread 714, effectively affect or alter the axial extent or distance dimension D4 as defined between the root portion of the rearward flank surface of a particular thread 714 and the root portion of the forward flank surface of an adjacent thread 714. These factors correspondingly affect the installation torque characteristics or properties of the threaded screw fastener 710 in that as the axial extent or distance dimension D4 is effectively increased, an increased amount of room or space is effectively provided in order to accommodate the material, comprising the substrate into which the threaded screw fastener 710 is being installed or inserted, thereby effectively reducing the installation or insertion torque characteristics or properties of the threaded screw fastener 710. It will also be appreciated that as the angular inclinations A1,A2 of the radially outer forward flank surface 718-1 and the radially inner forward flank surface 718-2 of each thread 714 are respectively varied, the radial extents D6,D5 of the radially outer forward flank surface 718-1 and the radially inner forward flank surface 718-2 of each thread 714 will likewise be varied. Again, all of these factors effectively influence the amount of material which is effectively present upon the threads 714 of the threaded screw fastener 710 for operatively engaging the material comprising the substrate into which the threaded screw fastener 710 is being inserted.

Continuing still further, and in accordance with additionally unique and novel teachings and principles of the present invention, it is seen that the radially inner rearward flank surface 716-2 is disposed at the angular inclination A4 with respect to the radially outer rearward flank surface 716-1, and that the radially outer rearward flank surface 716-1 is disposed at the angular inclination A3 with respect to the radius 724. As a result of this structural relationship, it is further seen that the radially inner rearward flank surface 716-2 is disposed so as to be more perpendicular with respect to the longitudinal axis 722 of the threaded screw fastener 710 than is the radially outer rearward flank surface 716-1. Since the degree of perpendicularity of the rearward flank surfaces of the threads of a threaded screw fastener is significantly determinative of the pull-out resistance characteristics or properties of the threaded screw fastener, it can be appreciated that by providing the radially inner rearward flank surface 716-2 as a distinctly separate planar surface with respect to or separate from the radially outer rearward flank surface 716-1, and wherein, for example, the radially inner rearward flank surface 716-2 can be disposed substantially perpendicular to the longitudinal axis 722 of the threaded screw fastener 710 while the radially outer rearward flank surface 716-1 is disposed at some predetermined angle, other than 90° with respect to the longitudinal axis 722 of the threaded screw fastener 710, then enhanced pull-out resistance characteristics or properties of the threaded screw fastener 710 can be achieved.

It is also noted in conjunction with the foregoing that by altering the radial extent or width dimension D3 of the radially inner rearward flank surface 716-2, the pull-out resistance characteristics or properties of the threaded screw fastener 710 can likewise be adjusted or altered. For example, as the radial extent or width dimension D3 of the radially inner rearward flank surface 716-2 is increased, the pull-out resistance characteristics or properties of the threaded screw fastener 710 will likewise be increased. Similar pull-out resistance characteristics or properties of the threaded screw fastener 710 can also be achieved by correspondingly altering the radial extent or width dimension D2 of the threads 714, as defined between the root portions 726 of the threads 714 and the crest portions 720 of the threads 714. In particular, by increasing the radial extent or width dimension D2 of the threads 714, the pull-out resistance characteristics or properties of the threaded screw fastener 710 will likewise be increased. In a still similar manner, the pull-out resistance characteristics or properties of the threaded screw fastener 710 can also be achieved by altering the axial extent or distance defined between identical points defined upon each pair of adjacent threads 714,714 as denoted by means of the linear pitch dimension D7. More particularly, as the linear pitch dimension D7 is decreased, whereby an increased number of threads 714 per axial inch is effectively achieved, the pull-out resistance characteristics or properties of the threaded screw fastener 710 are correspondingly increased.

It is lastly noted that while the separate planar radially outer and radially inner rearward flank surfaces 716-1,716-2 have been disclosed and discussed, it is not necessary to in fact provide such separate planar rearward flank surfaces in order to achieve the desired pull-out resistance characteristics or properties for the threaded screw fastener 710. More particularly, since the degree of perpendicularity of the rearward flank surfaces of the threads of the threaded screw fastener is significantly determinative of the pull-out resistance characteristics or properties of the threaded screw fastener, the separate planar radially outer and radially inner rearward flank surfaces 716-1,716-2 can in effect be coplanar as a result, for example, where the angular inclination A4, as defined between the separate planar radially outer and radially inner rearward flank surfaces 716-1,716-2, is effectively 0°. In this manner, the separate planar radially outer and radially inner rearward flank surfaces 716-1,716-2 effectively become a single planar rearward flank surface.

This single planar rearward flank surface of the threaded screw fastener 710 of the present invention is noted as being significantly different from the conventional PRIOR ART planar rearward flank surface 216 of the threaded screw fastener 210 in that the angular inclination A3 of such single planar rearward flank surface of the threaded screw fastener 710 of the present invention is such as to dispose the single planar rearward flank surface of the threaded screw fastener 710 of the present invention at an orientation which is substantially more perpendicular than that characteristic of the conventional PRIOR ART planar rearward flank surface 216 of the threaded screw fastener 210. In particular, for example, the conventional PRIOR ART planar rearward flank surface 216 of each threaded screw fastener 210 is disposed at an angular inclination which is within the range of 8–10°. However, in accordance with the principles and teachings of the present invention, the single planar rearward flank surface of the threaded screw fastener 710 of the present invention is disposed at an angle which is within the range of 0–7°, with the preferred angular inclination being 5°.

It is lastly to be noted that while the unique and novel teachings of the present invention can be applied to various conventionally sized threaded screw fasteners, the following chart illustrates the various exemplary flank surface angles A1,A2,A3,A4, as well as the various radial and axial linear dimensions D1,D2,D3,D4,D5,D6,D7, that have been developed in connection with a Number 15 threaded screw fastener. It will of course be appreciated that the various angles and linear dimensions may therefore vary depending upon the size of the particular threaded screw fastener.

EXAMPLE—A NUMBER 15 SIZED THREADED SCREW FASTENER

| | | |
|---|---|---|
| Angle of Radially Outer Forward Flank Surface | A1- | 20–40° |
| Angle of Radially Inner Forward Flank Surface | A2 | 0–35° |
| Angle of Radially Outer Rearward Flank Surface | A3 | 0–7° |
| Angle of Radially Inner Rearward Flank Surface | A4 | 0–7° |
| Axial Length of Thread Crest Portions | D1 | 0.005–0.015 inches |
| Radial or Width Extent of Fasteners Threads | D2 | 0.04–0.09 inches |
| Radial or Width Extent of Radially Inner Rearward Flank Surface | D3 | 0.00–0.09 inches |
| Axial Spacing Defined Between Root Portions of Adjacent Threads | D4 | 0.01–0.03 inches |
| Radial or Width Extent of Radially Inner Forward Flank Surface | D5 | 0.00–0.09 inches |
| Radial or Width Extent of Radially Outer Forward Flank Surface | D6 | 0.00–0.09 inches |
| Axial Length or Pitch Dimension Defined Between Identical Locations of Adjacent Threads | D7 | 0.067–0.091 inches |

Thus, it may be seen that in accordance with the principles and teachings of the present invention, there has been provided a new and improved threaded screw fastener which is provided with a head portion that has integrally incorporated therein unique and novel combination or dual drive means whereby the single threaded screw fastener can be rotatably driven by means of alternative rotary drive socket implements or tools, such as, for example, hexagonally configured or Phillips head configured drive means, or a combination drive tool. In this manner, the threaded screw fastener, having such combination head structure, can be drivingly inserted or installed within substrates regardless of the particular drive socket implement or tool being utilized by field installation or job site personnel. Furthermore, there is provided a new and improved drive socket implement or tool which has integrally incorporated therein both hexagonally configured drive structure, Phillips head drive structure, and domed contour structure for not only structurally accommodating both the hexagonally configured structure and the Phillips head structure integrally incorporated upon the head portion of the threaded screw fastener, but in addition, for accommodating the low profile domed structure of the head portion of the threaded screw fastener. Lastly, the threaded screw fastener also comprises thread structure wherein each thread of the threaded screw fastener comprises unique and novel rearward and forward flank surfaces which effectively serve to simultaneously enhance the pull-out resistance characteristics or properties of the threaded screw fastener while reducing the installation or insertion torque characteristics or properties of the threaded screw fastener.

Obviously, many variations and modifications of the present invention are possible in light of the above teachings. For example, it is to be noted that not all of the unique and novel head drive and thread features, as have been disclosed as being characteristic of the present invention, are necessarily included within a single threaded fastener, or within a single socket implement or tool. In addition, while the drive structure incorporated within the head portion of the threaded screw fastener, as well as the corresponding structure incorporated within the drive socket implement or tool, has been primarily disclosed as comprising the hexagonal and Phillips head drive structure, it is noted that other drive combinations are possible. For example, in lieu of the Phillips head drive structure, other drive structure, selected from the group comprising Torx drive means, six-lobe drive means, internal hex drive means, and square drive means, may likewise be employed in accordance with the principles and teachings of the present invention. It is therefore to be understood that within the scope of the appended claims, the present invention may be practiced otherwise than as specifically described herein.

What is claimed as new and desired to be protected by Letters Patent of the United States of America, is:

1. A threaded screw fastener adapted to be rotatably driven into a substrate, comprising:
    a threaded shank portion defined around a longitudinal axis;
    a head portion formed upon one end of said threaded shank portion, wherein said head portion comprises an underlying washer member having a peripherally extending edge portion disposed within a radially outwardly extending plane with respect to said longitudinal axis of said threaded shank portion, and an overlying dome-shaped circumferentially extending downwardly sloped surface portion extending downwardly toward said underlying washer member such that first peripheral edge portions of said downwardly extending overlying domed surface portion meet with second peripheral edge sections of said peripherally extending edge portion of said underlying washer member which are disposed within said radially outwardly extending plane; and
    dual drive means integrally formed upon said head portion of said threaded screw fastener for permitting said threaded screw fastener to be rotatably driven into a substrate by either one of two different types of rotary drive tools when either one of the two different types of rotary drive tools is respectively engaged with a corresponding one of said dual drive means integrally formed upon said head portion of said threaded screw fastener.

2. The threaded screw fastener as set forth in claim 1, wherein:
    said dual drive means integrally formed upon said head portion of said threaded screw fastener comprises first hexagonally configured drive means for engagement by correspondingly hexagonally configured rotary drive tool means, and second Phillips head drive means for engagement by correspondingly Phillips head configured rotary drive tool means.

3. The threaded screw fastener as set forth in claim 2, wherein:
    said underlying washer member of said head portion of said threaded screw fastener comprises a substantially circular washer member integrally formed upon said one end of said threaded shank portion;
    said first hexagonally configured drive means comprises upstanding structure disposed atop said substantially circular washer member; and
    said second Phillips head drive means comprises a substantially X-shaped recessed portion defined within an axially central region of said first hexagonally configured upstanding structure disposed upon said substantially circular washer member.

4. The threaded screw fastener as set forth in claim 3, wherein:
    said substantially circular washer member has a predetermined diametrical extent as defined by a peripheral extending edge portion; and
    said first hexagonally configured drive means, comprising said upstanding structure disposed atop said substantially circular washer member, has a diametrical extent which is substantially the same as said predetermined diametrical extent of said substantially circular washer member such that a plurality of shoulder portions are defined upon said substantially circular washer member between said first hexagonally configured upstanding structure and said peripherally extending edge portion of said substantially circular washer member.

5. The threaded screw fastener as set forth in claim 4, wherein:
    said first hexagonally configured upstanding structure disposed atop said substantially circular washer member has a plurality of upstanding facets disposed around a peripheral portion of said upstanding structure; and
    said dome-shaped, circumferentially downwardly sloped surface portion extends between, and interconnecting, said substantially X-shaped recessed portion and said peripheral portion of said hexagonally configured upstanding structure defined by said plurality of upstanding facets.

6. The threaded screw fastener as set forth in claim 2, wherein:
    said underlying washer member of said head portion of said threaded screw fastener comprises a substantially circular washer member integrally formed upon said one end of said threaded shank portion and comprising said peripherally extending edge portion;
    said first hexagonally configured drive means comprises a plurality of facets defined within said peripherally extending edge portion of said substantially circular washer member; and
    said second Phillips head drive means comprises a substantially X-shaped recessed portion defined within an axially central region of said overlying dome-shaped circumferentially extending downwardly sloped surface portion of said head portion of said threaded screw fastener.

7. The threaded screw fastener as set forth in claim 6, wherein:
    said dome-shaped, circumferentially extending downwardly sloped surface portion extends between, and interconnects, said substantially X-shaped recessed portion and said peripheral portion of said hexagonally configured drive means comprising said plurality of facets defined within said peripherally extending edge portion of said substantially circular washer member.

8. The threaded screw fastener as set forth in claim 4, wherein:
said first hexagonally configured drive means comprises a plurality of facets radially set back from said peripherally extending edge portion of said substantially circular washer member while corner regions defined between adjacent ones of said plurality of facets are disposed at said peripherally extending edge portion of said substantially circular washer member; and
said second Phillips head drive means comprises a substantially X-shaped recessed portion defined within an axially central region of said overlying dome-shaped circumferentially extending downwardly sloped surface portion of said head portion of said threaded screw fastener.

9. The threaded screw fastener as set forth in claim 1, wherein:
said dual drive means integrally formed upon said head portion of said threaded screw fastener comprises first hexagonally configured drive means for engagement by correspondingly hexagonally configured rotary drive tool means, and second head drive means selected from the group comprising Phillips head drive means, Torx drive means, six-lobe drive means, internal hex drive means, and square drive means for engagement by correspondingly configured rotary drive tool means.

10. In combination, a threaded screw fastener adapted to be rotatably driven into a substrate, and a rotary drive tool for rotatably driving said threaded screw fastener, comprising:
a threaded screw fastener comprising a threaded shank portion defined around a longitudinal axis; a head portion formed upon one end of said threaded shank portion, wherein said head portion comprises an underlying washer member having a peripherally extending edge portion disposed within a radially outwardly extending plane with respect to said longitudinal axis of said threaded shank portion, and an overlying convexly configured dome-shaped circumferentially extending downwardly sloped surface portion extending downwardly toward said underlying washer member such that first peripheral edge portions of said downwardly extending overlying domed surface meet with second peripheral edge sections of said peripherally extending edge portion of said underlying washer member which are disposed within said radially outwardly extending plane; and dual drive means integrally formed upon said head portion of said threaded screw fastener for permitting said threaded screw fastener to be rotatably driven into a substrate by either one of two different types of rotary drive tools when either one of the two different types of rotary drive tools is respectively engaged with a corresponding one of said dual drive means integrally formed upon said head portion of said threaded screw fastener; and
a rotary drive tool for rotatably driving said threaded screw fastener into a substrate, said rotary drive tool having drive means defined thereon for engaging at least one of said dual drive means defined upon said head portion of said threaded screw fastener in order to rotatably drive said threaded screw fastener into the substrate,
whereby said threaded screw fastener can be rotatably driven and installed within the substrate provided said drive means defined upon said rotary tool corresponds to at least one of said dual drive means defined upon said head portion of said threaded screw fastener.

11. The combination as set forth in claim 10, wherein:
said rotary drive tool further comprises a socket member defined around a longitudinal axis for enveloping said head portion of said threaded screw fastener; and
said drive means defined upon said rotary drive tool for engaging at least one of said dual drive means defined upon said head portion of said threaded screw fastener is disposed internally within said socket member.

12. The combination as set forth in claim 10, wherein:
said dual drive means integrally formed upon said head portion of said threaded screw fastener comprises first hexagonally configured drive means for engagement by correspondingly hexagonally configured rotary drive tool means, and second Phillips head drive means for engagement by correspondingly Phillips head configured rotary drive tool means; and
said drive means defined upon said rotary drive tool comprises at least one of hexagonally configured drive means for engaging said hexagonally configured drive means formed upon said head portion of said threaded screw fastener, and Phillips head configured drive means for engaging said Phillips head configured drive means formed upon said head portion of said threaded screw fastener.

13. The combination as set forth in claim 12, wherein:
said dual drive means integrally formed upon said head portion of said threaded screw fastener comprises first hexagonally configured drive means for engagement by correspondingly hexagonally configured rotary drive tool means, and second Phillips head drive means for engagement by correspondingly Phillips head configured rotary drive tool means; and
said drive means defined upon said rotary drive tool comprises both hexagonally configured drive means for engaging said first hexagonally configured drive means formed upon said head portion of said threaded screw fastener, and Phillips head configured drive means for engaging said second Phillips head configured drive means formed upon said head portion of said threaded screw fastener.

14. The combination as set forth in claim 10, wherein:
said dual drive means integrally formed upon said head portion of said threaded screw fastener comprises first hexagonally configured drive means for engagement by correspondingly hexagonally configured rotary drive tool means, and second drive means selected from the group comprising Phillips head drive means, Torx drive means, six-lobe drive means, internal hex drive means, and square drive means for engagement by correspondingly configured rotary drive tool means; and
said drive means defined upon said rotary drive tool comprises both hexagonally configured drive means for engaging said first hexagonally configured drive means formed upon said head portion of said threaded screw fastener, and second drive means, selected from the group comprising Phillips head drive means, Torx drive means, six-lobe drive means, internal hex drive means, and square drive means, for engaging a corresponding one of said second drive means formed upon said head portion of said threaded screw fastener.

15. The combination as set forth in claim 11, wherein:
said socket member has a concavely configured dome-shaped surface portion disposed internally within said socket member for accommodating said correspondingly convexly configured dome-shaped surface portion of said head portion of said threaded screw fastener.

16. A threaded screw fastener, adapted to be rotatably driven into a substrate, comprising:
a shank portion defined around a longitudinal axis;
a head portion formed upon one end of said shank portion; and
a plurality of threads disposed upon said shank portion of said threaded screw fastener and having a predetermined radially outward extent as measured along a radius extending perpendicular to said longitudinal axis of said shank portion;
wherein each one of said plurality of threads, disposed upon said shank portion of said threaded screw fastener, comprises a crest portion disposed substantially parallel to said longitudinal axis of said shank portion, a rearward flank portion, and a forward flank portion;
wherein said forward flank portion of each one of said plurality of threads comprises first and second radially outer and radially inner flank surfaces wherein said first radially outer flank surface has a radially outer end portion integrally connected to said crest portion, a radially inner end portion of said first radially outer flank surface is integrally connected to a radially outer end portion of said second radially inner flank surface, and a radially inner end portion of said second radially inner flank surface is integrally connected to said shank portion, wherein said second radially inner forward flank surface is always disposed at a steeper angle with respect to said longitudinal axis of said shank portion than is said first radially outer forward flank surface such that less material is effectively present upon said forward flank portion of each one of said plurality of threads within the vicinity of said longitudinal axis of said shank portion such that installation torque of said threaded screw fastener, when installed within the substrate, is substantially reduced; and
wherein substantially the entire radial extent of said rearward flank portion of each one of said plurality of threads is disposed substantially perpendicular to said longitudinal axis of said shank portion, such that pullout resistance of said threaded screw fastener, after being installed within the substrate, is substantially increased, and comprises first and second radially outer and radially inner flank surfaces wherein said first radially outer flank surface has a radially outer end portion integrally connected to said crest portion, a radially inner end portion of said first radially outer flank surface is integrally connected to a radially outer end portion of said second radially inner flank surface, and a radially inner end portion of said second radially inner flank surface is integrally connected to said shank portion, wherein said second radially inner rearward flank surface is always disposed at a steeper angle with respect to said longitudinal axis of said shank portion than is said first radially outer rearward flank surface such that pullout resistance of said threaded screw fastener, when installed within the substrate, is substantially increased.

17. The threaded screw fastener as set forth in claim 16, wherein:
said first radially outer forward flank surface is disposed at an angular orientation which is within the range of 20–40° with respect to a radius of said shank portion;
said second radially inner forward flank surface is disposed at an angular orientation which is within the range of 0–35° with respect to said radius of said shank portion;
said first radially outer rearward flank surface is disposed at an angular orientation which is with the range of 0–7° with respect to said radius of said shank portion; and
said second radially outer rearward flank surface is disposed at an angular orientation which is within the range of 0–7° with respect to said first radially outer rearward flank surface.

* * * * *